United States Patent
Thottuvelil et al.

[11] Patent Number: 5,949,658
[45] Date of Patent: Sep. 7, 1999

[54] EFFICIENCY MULTIPLE OUTPUT DC/DC CONVERTER

[75] Inventors: Vijayan Joseph Thottuvelil, Plano; Richard William Farrington, Heath, both of Tex.

[73] Assignee: Lucent Technologies, Inc., Murray Hill, N.J.

[21] Appl. No.: 08/982,131

[22] Filed: Dec. 1, 1997

[51] Int. Cl.$^6$ .................................................. H02M 3/335
[52] U.S. Cl. ............................... 363/15; 363/17; 363/132
[58] Field of Search ................................. 363/15, 16, 17, 363/78, 81, 84, 95, 98, 123, 125, 131, 132

[56] References Cited

U.S. PATENT DOCUMENTS

| 3,758,840 | 9/1973 | Oliver | 363/15 |
| 5,144,222 | 9/1992 | Herbert | 323/271 |
| 5,528,480 | 6/1996 | Kikinis et al. | 363/15 |

*Primary Examiner*—Adolf Deneke Berhane
*Attorney, Agent, or Firm*—Locke Liddell & Sapp LLP

[57] ABSTRACT

A multiple output dc to dc converter is described that improves efficiency for auxiliary outputs using a secondary side switch. The converter uses a switching circuit to place an alternating voltage from a dc power source across a transformer. The switching circuit is controlled by a primary PWM controller which regulates the primary output voltage by adjusting the duty cycle of the switching circuit. The switching circuit produces an alternating voltage across the center-tapped winding of the transformer, which is rectified by diodes connected to the winding to create a full-wave output. This output is used by a primary output circuit to create the primary output voltage, and is also used to create an auxiliary output voltage by using a secondary side switch and auxiliary PWM controller to regulate the auxiliary output. A bypass element, which can be a diode, is connected between the transformer and the auxiliary output circuit to bypass the auxiliary switch during one phase of the full wave output cycle, thereby increasing the efficiency of the auxiliary output by eliminating losses due to the switch during that phase. The invention can be used with any common converter topology that uses a full wave type output, including, but not limited to, full-bridge, half-bridge, push-pull, clamped-mode forward converter, or any other topology with a full-wave rectified output.

22 Claims, 6 Drawing Sheets

EFFICIENCY MULTIPLE OUTPUT DC/DC CONVERTER

This invention relates to dc to dc power supplies and converters with multiple outputs. More particularly, the invention relates to a multiple output dc to dc converter with improved efficiency at the auxiliary output.

BACKGROUND OF THE INVENTION

In many power converter applications there is a need for multiple output converters where all output voltages are tightly regulated. Multiple converters can be used, but are expensive to implement because of component cost, particularly because of the multiple transformers required. Another approach to accomplish this is to use a post secondary side controlled switch whose duty cycle is modulated to provide tight output voltage regulation. While more cost effective, this approach results in lower efficiency than using multiple converters due to the fact that in the secondary side switch approach current delivered to the auxiliary output must effectively pass through two switches during a portion of the switching cycle. The present invention describes a multiple output converter with a secondary side switch that has improved efficiency at the auxiliary output. The present invention can be implemented in any push-pull or full-wave rectified output, such as full-bridge, half-bridge, push-pull, clamped-mode forward converter, or any similar converter topology.

SUMMARY OF THE INVENTION

In accordance with the present invention, a multiple output dc to dc converter is described with improved efficiency at the auxiliary output. The converter uses a switching circuit controlled by a primary controller to create a full wave output having two alternating phases across a transformer. A primary output circuit is connected to the transformer such that the full wave output created by the switching circuit is rectified and filtered to create the primary output voltage. An auxiliary output circuit is connected to the primary output circuit by an auxiliary switch. The auxiliary switch is controlled by an auxiliary controller to regulate the auxiliary output voltage. To achieve improved efficiency, a bypass element is connected from the transformer to the auxiliary output circuit such that the auxiliary switch is bypassed during one of the two alternating phases of the full wave output. The bypass element allows all of the energy of the bypassing phase to be used directly by the auxiliary output circuit without having the bypassing phase regulated or flowing through the auxiliary switch.

The features and advantages of the invention will become more readily understood from the following detailed description taken in conjunction with the appended claims and attached drawing wherein:

DESCRIPTION OF THE PREFERRED EMBODIMENTS

Figure 1:
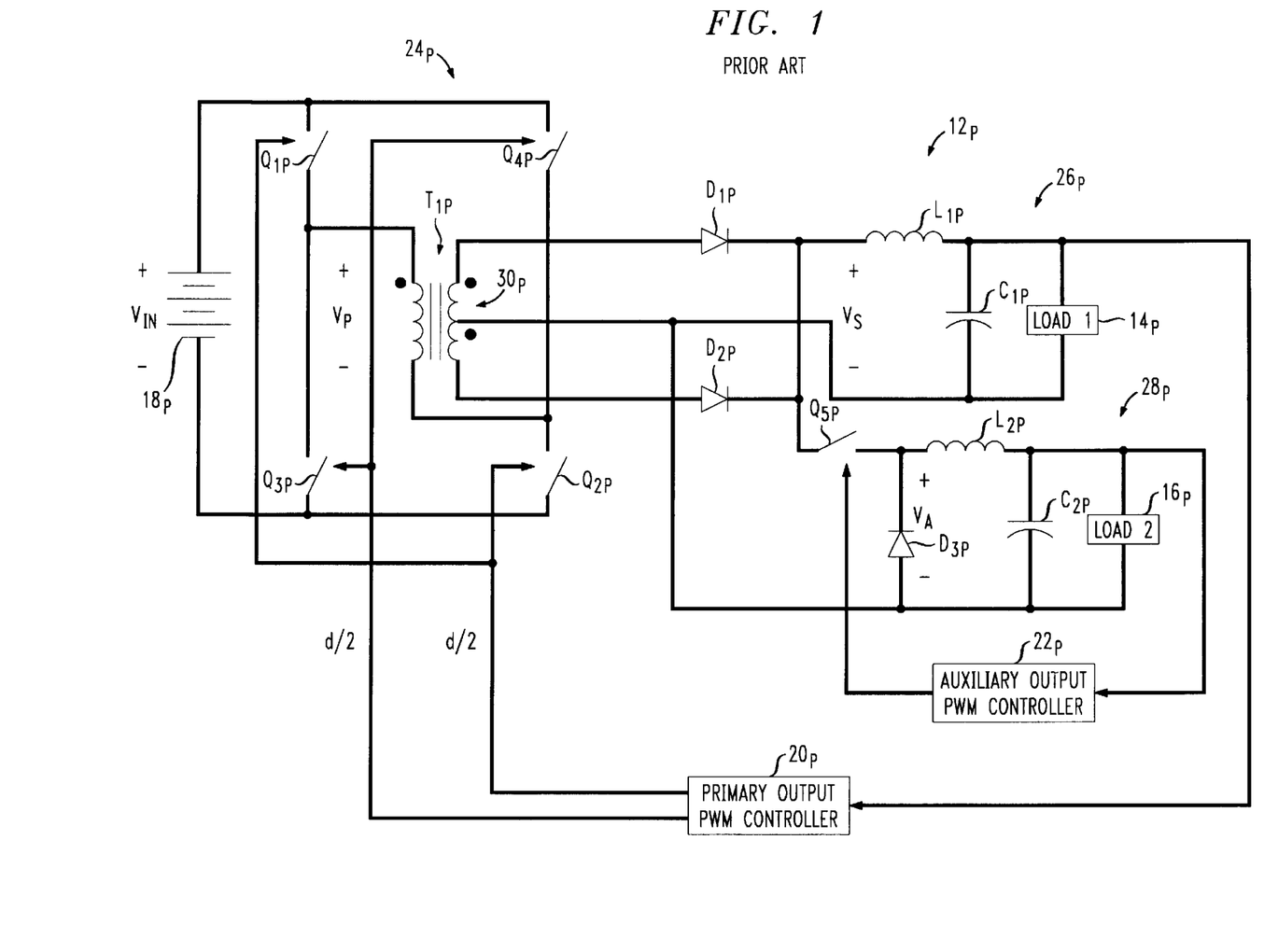
FIG. 1 is a prior art converter circuit with secondary side switch.

FIG. 1 shows a prior art converter producing an auxiliary output voltage using a post secondary side switch regulated by an auxiliary pulse width modulated ("PWM") controller. Prior art converter 12p operates to supply constant output voltages to primary load 14p and auxiliary load 16p from dc source 18p. DC source 18p is applied across transformer T1p by switching circuit 24p. Switching circuit 24p applies dc source 18p across transformer T1p by closing switches Q1p and Q2p alternately with switches Q3p and Q4p. Switches Q1p, Q2p, Q3p, and Q4p are controlled by primary PWM controller 20p which regulates the output voltage by varying the duty cycles of switches Q1p and Q2p and switches Q3p and Q4p. When switches Q1p and Q2p are closed by primary PWM controller 20p the transformer voltage $V_p$ is equal to $V_{in}$. Similarly, when switches Q3p and Q4p are closed by primary PWM controller 20p the transformer voltage $V_p$ is $-V_{in}$.

The action of switching circuit 24p provides the voltage across transformer T1p which powers primary output circuit 26p. The voltage induced across transformer T1p is proportional to the ratio of the number of turns in the windings of transformer T1p. During the portion of a cycle when switches Q1p and Q2p are closed, transformer voltage $V_p$ is induced in center tapped winding 30p of transformer T1p. In this phase of the full wave output, transformer voltage $V_p$ is positive, resulting in the forward biasing of diode D1p and reverse biasing diode D2p which act as rectifying diodes. This allows current to flow in the portion of center tapped winding 30p associated with diode D1p while current is prevented from flowing in the portion of center tapped winding 30p associated with diode D2p. During the other phase of the full wave output, when switches Q3p and Q4p are closed, transformer voltage $V_p$, across transformer T1p, is negative. This induces a voltage across transformer T1p which reverse biases diode D1p and forward biases diode D2p. With diode D2p forward biased, current flows through only the portion of center tapped winding 30p associated with diode D2p. The alternating voltage across transformer T1 produced by switching circuit 24p, when rectified through diode D1p or diode D2p, is filtered by inductor L1p and capacitor C1p to then provide power to primary load 14p.

Auxiliary output circuit 28p is used to provide the auxiliary output voltage for auxiliary load 16p. The voltage across transformer T1p is also used to supply the energy used to create the auxiliary output voltage for auxiliary load 16p. Auxiliary switch Q5p is used to regulate the auxiliary output voltage and has its duty cycle controlled by auxiliary PWM controller 22p. Inductor L2p and capacitor C2p provide the same filtering function for auxiliary load 16p as inductor L1p and capacitor C1p do for primary load 14p. Diode D3p acts as the freewheeling diode when auxiliary switch Q5 is open. Prior art converter 12p has reduced efficiency at the auxiliary output compared to multiple converters, since the current supplied to auxiliary load 16p must always effectively flow through the additional switch Q5p before being supplied to auxiliary load 16p.

Figure 2:
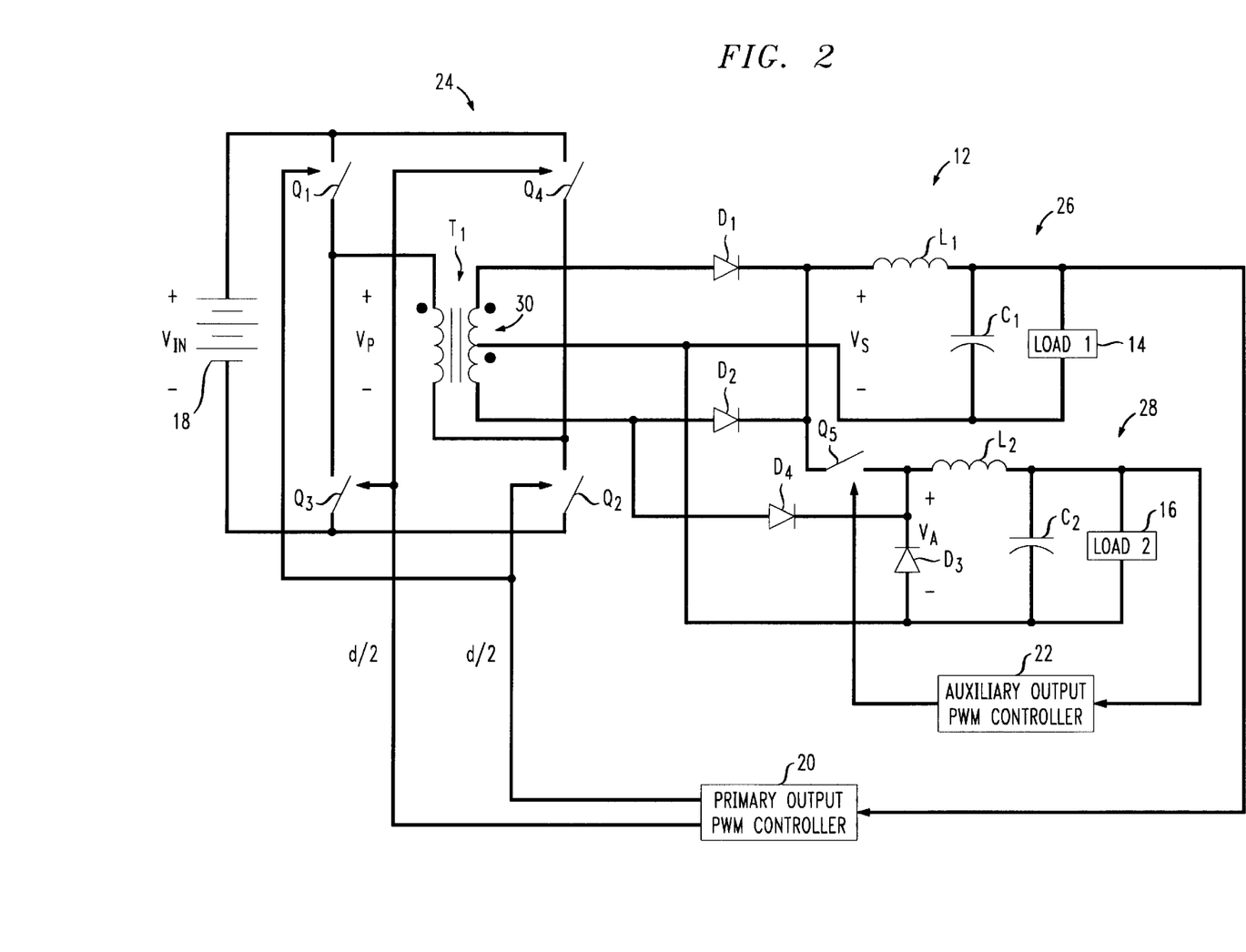
FIG. 2 is a circuit diagram of a multiple output full-bridge converter with secondary-side switch for auxiliary output regulation incorporating the present invention.

Referring now to FIG. 2, the preferred embodiment of the present invention with respect to a multiple output full-bridge converter is shown. Improved efficiency at the auxiliary output over prior art converter 12p from FIG. 1 can be obtained by eliminating the auxiliary switch from the current path during one phase of the full wave output. This is accomplished by connecting a bypass element from transformer T1 to auxiliary output circuit 28 to bypass auxiliary switch Q5 when either diode D1 or diode D2, acting as rectifying diodes, is conducting current. The bypass element is shown in FIG. 2 as diode D4 which is connected from transformer T1 to the node formed by inductor L1 and diode D3. Although the bypass element is shown in FIG. 2 as a diode, it could also be a synchronous rectification FET, or any other suitable component. In this configuration diode D4 is used to bypass auxiliary switch Q5 during the portion of a cycle where transformer voltage $V_p$ is negative causing diode D2 to be forward biased and current to flow in the portion of center tapped winding 30 associated with diode D2. This allows all of the energy during the portion of the cycle where diode D2 is forward biased to be transmitted to auxiliary load 16 without being regulated by auxiliary switch Q5 and auxiliary PWM controller 22. Auxiliary switch Q5 is still used to regulate the auxiliary output voltage during the phase of the full wave output in which transformer voltage $V_p$ is positive causing diode D1 to be forward biased and conducting.

The remainder of the operation of converter 12 is the same as that of prior art converter 12p discussed with respect to FIG. 1. Closing switches Q1 and Q2 places $V_{in}$ from DC source 18 across transformer T1 which causes diode D1 to be forward biased and diode D2 to be reverse biased, resulting in a current though the portion of center tapped winding 30 associated with diode D1. Similarly, opening switches Q1 and Q2, and closing switches Q3 and Q4 places $-V_{in}$ across transformer T1, forward biasing diode D2 and reverse biasing diode D1, resulting in current flowing in the portion of center tapped winding 30 associated with diode D2. Switches Q1 and Q2 are cycled alternately with switches Q3 and Q4 as controlled by primary PWM controller 20 to produce a full wave output. Inductor L1 and capacitor C1 are used to filter the rectified voltage and ensure a constant output voltage across primary load 14. Inductor L2 and capacitor C2 form a filter to ensure that a constant output voltage is maintained across auxiliary load 16, while freewheeling diode D3 is used to allow current flow through inductor L2 while switch Q5 is off.

Figure 3A:
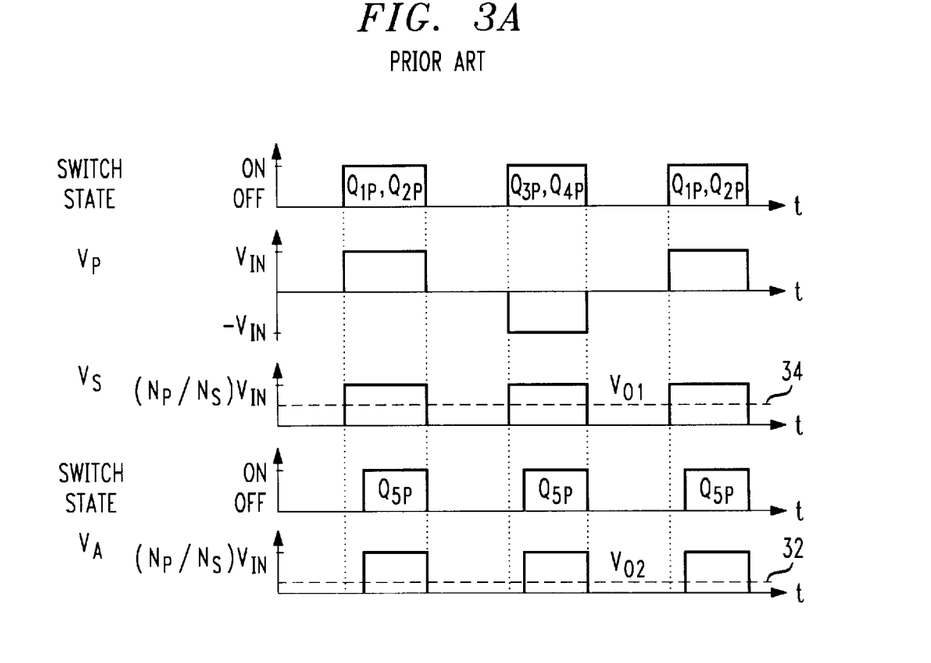
FIG. 3a is a timing diagram for a prior art full-bridge converter with secondary-side switch.

The improved efficiency of the present invention can be seen by comparing the timing diagrams of FIG. 3a with those of 3b. FIG. 3a shows the circuit waveforms for the multiple output full-bridge converter of FIG. 1 while FIG. 3b shows the corresponding waveforms for the improved multiple output full-bridge converter of the present invention shown in FIG. 2.

Looking at the switch states of switches Q1, Q2, Q3, and Q4, switches Q1 and Q2 when closed places $V_{in}$ across transformer T1, shown as a positive transformer voltage $V_p$. This results in diode D1 being forward biased as described above with reference to FIGS. 1 and 2. Alternately, switches Q3 and Q4 place $-V_{in}$ across transformer T1, shown as a negative transformer voltage $V_p$. This switch state results in diode D2 being forward biased as described above again with reference to FIGS. 1 and 2. The result of the alternate switching of Q1 and Q2 with Q3 and Q4 is the full-wave output, shown as $V_s$ where each of the two phases of $V_s$ is supplied alternately through diode D1 and diode D2. Primary output voltage 34 is the average of $V_s$.

The improved efficiency of the present invention can be seen in the regulation scheme of the auxiliary output. FIG. 3a shows the standard method which regulates each phase of $V_s$ to achieve auxiliary voltage $V_a$ and auxiliary output voltage 32. The addition of diode D4 in FIG. 2 bypasses switch Q5 in the portion of the cycle where diode D2 is forward biased and conducting, allowing all of $V_s$ during that phase to be used to supply the auxiliary output voltage without being regulated or passing through auxiliary switch Q5. Auxiliary output voltage 32 is regulated only with the portions of $V_s$ corresponding to the portion of the cycle that diode D1 is forward biased and conducting. Converter 12p from FIG. 3a, regulates every phase of $V_s$ resulting in higher losses and decreased efficiency at the auxiliary output due to the losses associated with auxiliary switch Q5.

Figure 3B:
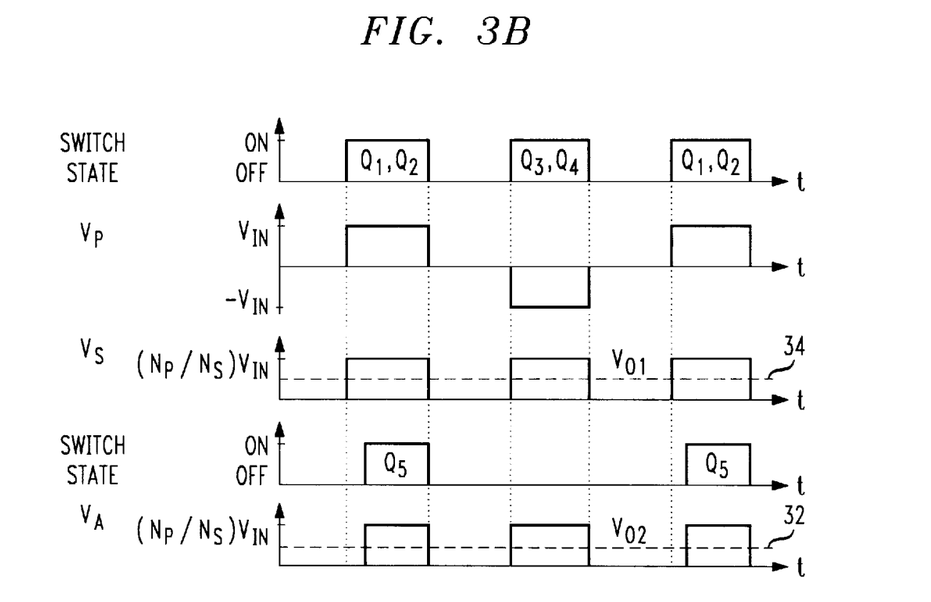
FIG. 3b is a timing diagram for the circuit of FIG. 2 which incorporates the present invention.

As can be inferred from FIG. 3b, the present invention is not limited to use in full-bridge converters. In fact any converter topology which produces a full-wave output such as $V_s$, can be modified in accordance with the present invention.

Figure 4:
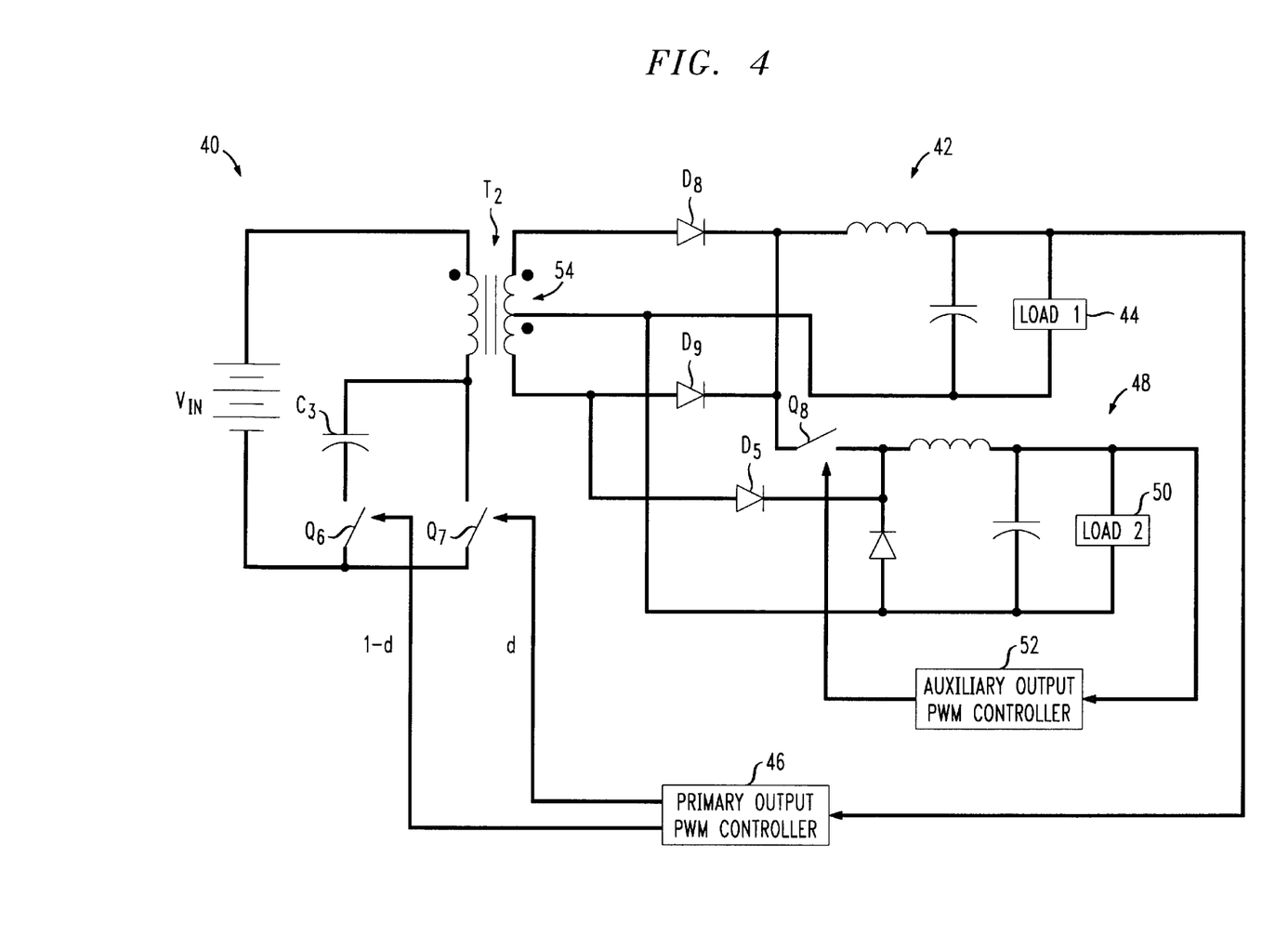
FIG. 4 is a circuit diagram of a multiple output clamped-mode forward converter with secondary-side switch for auxiliary output regulation incorporating the present invention.

FIG. 4 shows the preferred embodiment of the present invention with respect to a multiple output clamped-mode forward converter. Switching circuit 40 is used to place $V_{in}$ across transformer T2. Switches Q6 and Q7 are controlled by primary PWM controller 46 which varies their duty cycle to regulate power at primary load 44. When switch Q7 is closed and switch Q6 is opened, $V_{in}$ is placed across transformer T2 which forward biases diode D8 and reverse biases diode D9, resulting in a current through the portion of center tapped winding 54 associated with diode D8. Conversely, when switch Q6 is closed and switch Q7 is opened, the voltage across capacitor C3 causes a negative voltage to appear across transformer T2 such that diode D9 of primary output circuit 42 is now forward biased and diode D8 is reverse biased. This causes a current in the portion of center tapped winding 54 associated with diode D9. The remainder of primary output circuit 42 operates identically to primary output circuit 26 described with respect to FIG. 2.

Auxiliary output circuit 48 also operates identically to auxiliary output circuit 28 described with reference to the improved full-bridge converter of FIG. 2. Auxiliary switch Q8, controlled by auxiliary PWM controller 52 is used to regulate the voltage across auxiliary load 50. Diode D5, acting as a bypass element, is used to bypass auxiliary switch Q8 when diode D9 is forward biased and current is flowing in the portion of center tapped winding 54 associated with diode D9. The bypassing of auxiliary switch Q8 during one phase of the full wave output results in the improved efficiency discussed with reference to FIG. 3b. As before, the other phase of the full wave output, when diode D8 is conducting, is adjusted by auxiliary switch Q8 to keep the auxiliary voltage tightly regulated.

Figure 5:
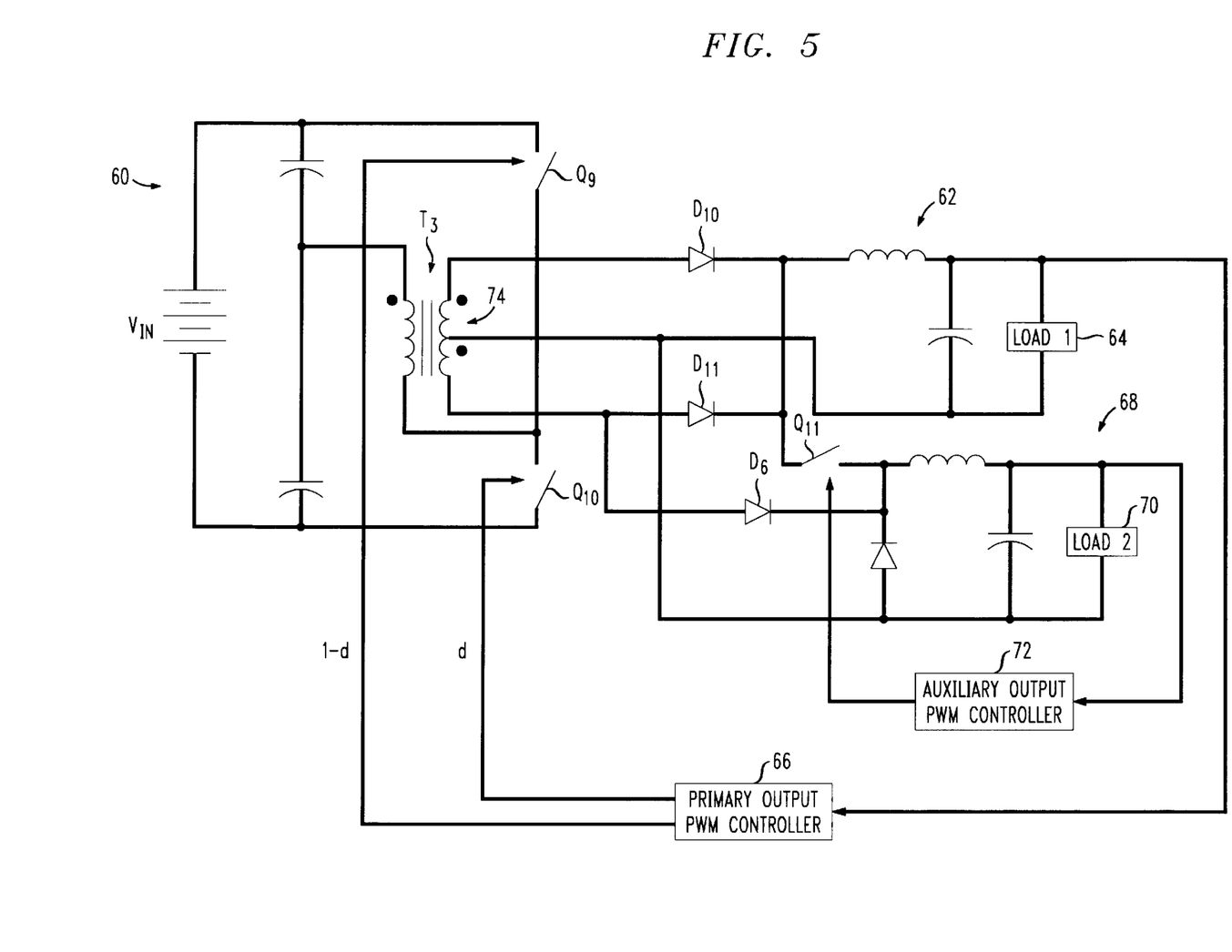
FIG. 5 is a circuit diagram of a multiple output half-bridge converter with secondary-side switch for auxiliary output regulation incorporating the present invention.

FIG. 5 shows the preferred embodiment of the present invention with respect to a multiple output half-bridge converter. Switching circuit 60 of the half-bridge converter is used to place $V_{in}$ across transformer T3. Switches Q9 and Q10 are controlled by primary PWM controller 66 which varies their duty cycle to regulate power at primary load 64, just as with the full-bridge converter of FIG. 2 and the clamped-mode converter of FIG. 4. In this case when Q10 is closed, $V_{in}$ is placed across primary winding P3 which forward biases diode D10 and reverse biases diode D11, resulting in a current in the portion of center tapped winding 74 associated with diode D10. In the other half of the cycle, when Q9 is closed, $-V_{in}$ is placed across transformer T3 causing diode D11 of primary output circuit 62 to be forward biased and diode D10 to be reversed biased, resulting in current in the portion of center tapped winding 74 associated with diode D11. As before, primary output circuit 62 operates identically to primary output circuit 26 described with respect to FIG. 2.

Auxiliary output circuit 68 also operates identically to auxiliary output circuit 28 described with reference to the full-bridge converter of FIG. 2. Auxiliary switch Q11, controlled by auxiliary PWM controller 72 is used to regulate the voltage across auxiliary load 70 when diode D10 is conducting. Diode D6, acting as a bypass element, is used to bypass auxiliary switch Q11 when diode D11 of primary output circuit 62 is forward biased and current in flowing in the portion of center tapped winding 74 associated with diode D11. This again results in the improved efficiency discussed with reference to FIG. 3b because current, during the time that diode D11 is conducting, is not regulated or forced to flow through auxiliary switch Q11 in order to provide power to the auxiliary load.

Figure 6:
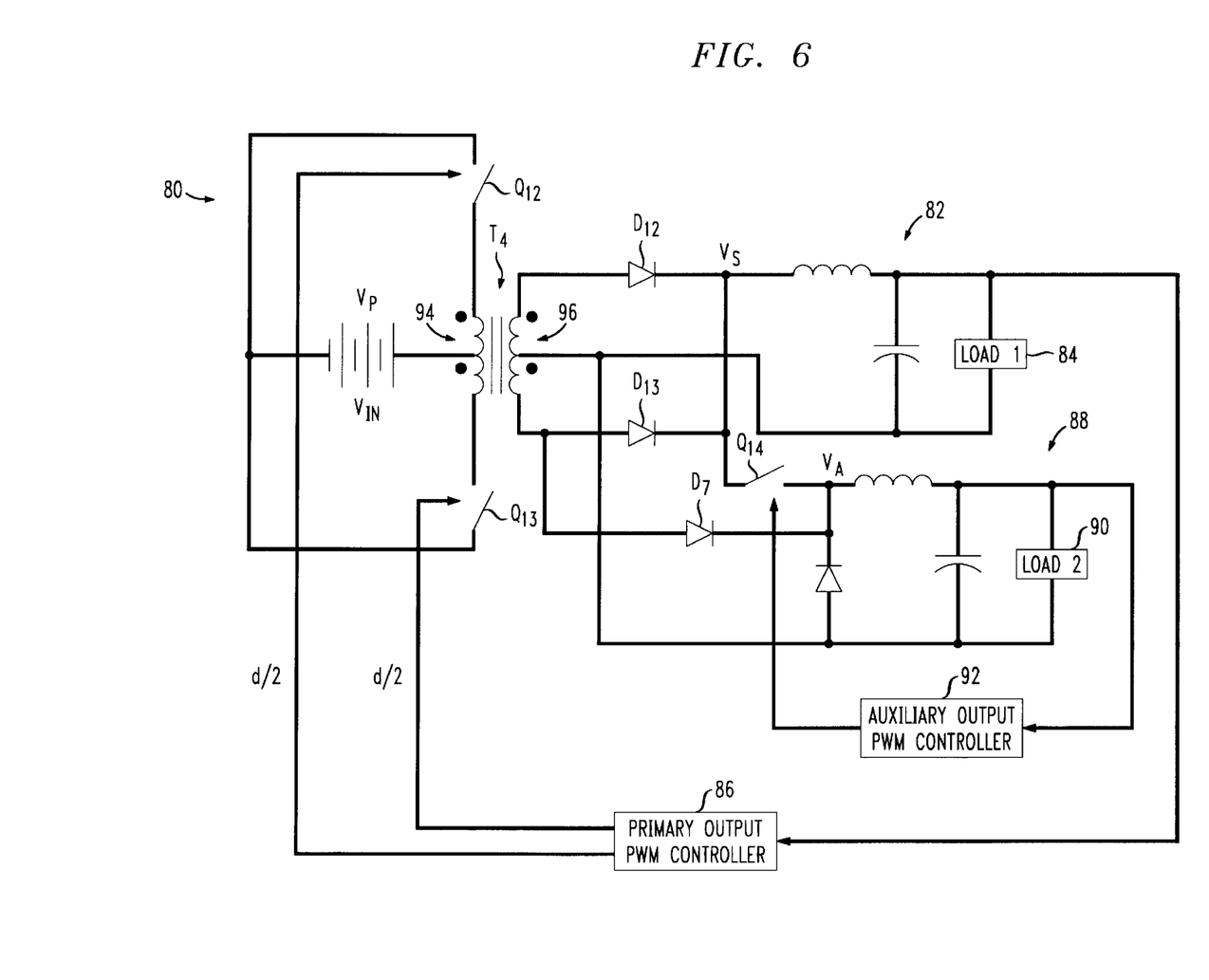
FIG. 6 is a circuit diagram of a multiple output push-pull converter with secondary-side switch for auxiliary output regulation incorporating the present invention.

FIG. 6 shows the preferred embodiment of the present invention with respect to a multiple output push-pull converter. The push-pull converter of FIG. 6 operates very similarly to the circuits described with respect to FIGS. 2, 4, and 5. Switching circuit 80 is used to place $V_{in}$ across primary center tapped winding 94 of transformer T3. Switches Q12 and Q13 are controlled by primary PWM controller 86 which varies their duty cycle to regulate power at primary load 84, just as with the other converter configurations. With the push-pull converter of FIG. 6, closing Q12 induces a voltage in secondary center tapped winding 96 causing diode D12 of primary output circuit 82 to be forward biased and diode D13 to be reverse biased, resulting in a current through the portion of secondary center tapped winding 96 associated with diode D12. When Q13 is closed, a voltage is induced in secondary center tapped winding 96 causing diode D13 to forward bias and diode D12 to reverse bias. This results in a current through the portion of secondary center tapped winding 96 associated with diode D13. Primary output circuit 82 operates identically to primary output circuit 26 described with respect to FIG. 2, and auxiliary output circuit 88 operates identically to auxiliary output circuit 28 described above. Auxiliary switch Q14, controlled by auxiliary PWM controller 92 regulates the voltage across auxiliary load 90 during the phase of the full wave output when diode D12 is conducting. As before, diode D7, acting as a bypass element, is used to bypass auxiliary switch Q14 when diode D13 is conducting current, resulting in improved efficiency at the auxiliary output.

The converter topologies described with reference to FIGS. 2, 4, 5, and 6 are examples of topologies that can be improved by the present invention and are not meant to be limiting. As discussed, any converter topology with a full-wave output from a switching circuit can be modified in accordance with the present invention. Additionally, the bypass element in the circuit described was used so as to bypass the auxiliary switch during a particular phase of primary output circuit or while a particular diode was conducting. It can be easily seen that the bypass element could be used during either phase of the full wave output, or while either of the diodes in the output circuit is conducting, leaving the auxiliary switch to regulate the auxiliary output during the other phase, or while the other diode conducts, in accordance with the present invention and still accomplish the desired increase in efficiency at the auxiliary output.

All of the elements shown in FIGS. 2, 4, 5, and 6 are standard electrical components, and are commonly available. The switches used can be any appropriate switch with a sufficient switching speed, such as semiconductor or magnetic amplifier switches. The PWM converters are also well known in the art, and could be any standard PWM controller, such as any of the UC1825 family of PWM control ICs from Unitrode Integrated Circuits, Merrimack, N.H.

It is to be understood that although the invention has been described with particular reference to specific embodiments thereof, the form of the invention shown and described in detail is to be taken as the preferred embodiment of same, and that various changes and modifications may be resorted to without departing from the spirit and scope of the invention as defined by the appended claims.

What is claimed:

1. A multiple output dc to dc converter to provide a primary output voltage and an auxiliary output voltage, comprising:
   a) a transformer;
   b) a switching circuit controlled by a primary controller, the switching circuit operable to create a full wave output across the transformer;
   c) a primary output circuit coupled to the switching circuit by the transformer and producing the primary output voltage;
   d) an auxiliary output circuit connected to the primary output circuit, the auxiliary output circuit including an auxiliary switch controlled by an auxiliary controller which regulates the auxiliary output voltage; and
   e) a bypass element connected from the transformer to the auxiliary output circuit such that the auxiliary switch is bypassed during alternating phases of the full wave output across the transformer.

2. The multiple output dc to dc converter of claim 1 wherein the transformer includes a center tapped winding connected to the primary output circuit, and two rectifying diodes, one connected to either end of the center tapped winding, and wherein the bypass element is connected to one end of the center tapped winding and bypasses the auxiliary switch when current is flowing in the rectifying diode associated with the end of the center tapped winding connected to the bypass element.

3. The multiple output dc to dc converter of claim 1 wherein the bypass element is a diode.

4. The multiple output dc to dc converter of claim 1 wherein the multiple output dc to dc converter is a full-bridge converter with a secondary side switch for auxiliary output regulation.

5. The multiple output dc to dc converter of claim 1 wherein the multiple output dc to dc converter is a clamped-mode forward converter with a secondary side switch for auxiliary output regulation.

6. The multiple output dc to dc converter of claim 1 wherein the multiple output dc to dc converter is a half-bridge converter with a secondary side switch for auxiliary output regulation.

7. The multiple output dc to dc converter of claim 1 wherein the multiple output dc to dc converter is a push-pull converter with a secondary side switch for auxiliary output regulation.

8. A multiple output dc/dc converter to provide a primary output voltage and an auxiliary output voltage from a dc power source with voltage $V_{in}$, comprising:
   a) a transformer;
   b) a switching circuit having at least one switch connected to the transformer;
   c) a primary controller connected to the switching circuit, the controller opening and closing the at least one switch to produce a full wave output having a first and second phase across the transformer, the primary controller to control the duty cycle of the at least one switch in response to the primary output voltage, thereby regulating the primary output voltage;

d) a primary output circuit coupled to the switching circuit by the transformer and to provide the primary output voltage;

e) an auxiliary output circuit connected to the primary output circuit, and including an auxiliary switch;

f) an auxiliary controller connected to the auxiliary switch to regulate the secondary output voltage during the first phase of the full wave output; and g) a bypass element connected from the transformer to the auxiliary output circuit such that the auxiliary switch is bypassed during the second phase of the full wave output.

9. The multiple output dc to dc converter of claim 8 wherein the transformer includes a center tapped winding and two rectifying diodes, one rectifying diode at each end of the center tapped winding which connect the center tapped winding to the primary output circuit, wherein the alternating phases of the a voltage are induced across the center tapped winding and cause a current in the first rectifying diode when $V_{in}$ is placed across the transformer by the switching circuit, thereby forming the first phase of the full wave output and wherein a negative voltage is induced across the center tapped winding which causes a current in the second rectifying diode when $-V_{in}$ is placed across the transformer by the switching circuit to form the second phase of the full wave output.

10. The multiple output dc to dc converter of claim 9 wherein the primary output circuit includes a capacitor connected in parallel with a primary load which is connected across the primary output voltage, and an inductor connected between the primary load and two blocking diodes which are connected to the center tapped winding, and the auxiliary output circuit includes a capacitor connected in parallel with an auxiliary load connected across the auxiliary output voltage, an inductor connected between the auxiliary load and the auxiliary switch and bypass element, and a freewheeling diode connected between the auxiliary load and the inductor to provide a current path when the auxiliary switch is open.

11. The multiple output dc to dc converter of claim 8 wherein the multiple output dc to dc converter is a full-bridge converter with a secondary side switch for auxiliary output regulation.

12. The multiple output dc to dc converter of claim 8 wherein the multiple output dc to dc converter is a clamped-mode forward converter with a secondary side switch for auxiliary output regulation.

13. The multiple output dc to dc converter of claim 8 wherein the multiple output dc to dc converter is a half-bridge converter with a secondary side switch for auxiliary output regulation.

14. The multiple output dc to dc converter of claim 8 wherein the multiple output dc to dc converter is a push-pull converter with a secondary side switch for auxiliary output regulation.

15. The multiple output dc to dc converter of claim 8 wherein the bypass element is a diode.

16. A method for increasing the efficiency of a multiple output dc/dc converter comprising the steps of:

a) using a switching circuit connected to a transformer and controlled by a controller to produce a full-wave output across the transformer and to regulate a primary output voltage produced by a primary output circuit connected to the transformer;

b) using an auxiliary switch connected between the primary output circuit and an auxiliary output circuit to regulate an auxiliary output voltage, the auxiliary switch controlled by an auxiliary controller; and c) bypassing the auxiliary switch by placing a bypass element between the transformer and the auxiliary output circuit such that the auxiliary switch is bypassed during alternating phases of the full-wave output.

17. The method of claim 16 wherein the transformer includes a center tapped winding connected to the primary output circuit, and two rectifying diodes, one connected to either end of the center tapped winding, wherein the bypass element is connected to one end of the center tapped winding and bypasses the auxiliary switch when current is flowing in the rectifying diode associated with the end of the center tapped winding connected to the bypass element.

18. The method of claim 17 wherein step (c) requires the placing of the bypass element between the second portion of the center tapped winding and the auxiliary output circuit, so that the phase of the full-wave output associated with the second portion of the center tapped winding bypasses, via the bypass element, the auxiliary switch when current is flowing in the second portion of the center tapped winding.

19. The method of claim 16 wherein the multiple output dc to dc converter is a full-bridge converter with a secondary side switch for auxiliary output regulation.

20. The method of claim 16 wherein the multiple output dc to dc converter is a clamped-mode forward converter with a secondary side switch for auxiliary output regulation.

21. The method of claim 16 wherein the multiple output dc to dc converter is a half-bridge converter with a secondary side switch for auxiliary output regulation.

22. The method of claim 16 wherein the multiple output dc to dc converter is a push-pull converter with a secondary side switch for auxiliary output regulation.

* * * * *